US012273658B2

(12) United States Patent
Deshmukh et al.

(10) Patent No.: US 12,273,658 B2
(45) Date of Patent: Apr. 8, 2025

(54) SYSTEM AND METHOD OF INTRUDER DETECTION

(71) Applicant: Jio Platforms Limited, Ahmedabad (IN)

(72) Inventors: Anurag Anil Deshmukh, Gujarat (IN); Jitendra Bhatia, Navi Mumbai (IN); Shardrul Shailendra Parab, Pune (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 17/937,493

(22) Filed: Oct. 3, 2022

(65) Prior Publication Data
US 2023/0105423 A1 Apr. 6, 2023

(30) Foreign Application Priority Data
Oct. 1, 2021 (IN) .............................. 202121044560

(51) Int. Cl.
H04N 7/18 (2006.01)
G06T 7/292 (2017.01)
G06T 7/70 (2017.01)
G06V 20/40 (2022.01)
G06V 20/52 (2022.01)
G08B 13/196 (2006.01)

(52) U.S. Cl.
CPC ............ H04N 7/181 (2013.01); G06T 7/292 (2017.01); G06T 7/70 (2017.01); G06V 20/46 (2022.01); G06V 20/52 (2022.01); G08B 13/19613 (2013.01); G06T 2210/12 (2013.01)

(58) Field of Classification Search
None
See application file for complete search history.

(56) References Cited

U.S. PATENT DOCUMENTS

| | | | |
|---|---|---|---|
| 2006/0200842 A1* | 9/2006 | Chapman | H04N 21/235 348/E7.061 |
| 2019/0311201 A1* | 10/2019 | Selinger | G08B 25/006 |
| 2019/0313024 A1* | 10/2019 | Selinger | G08B 13/19636 |
| 2019/0384989 A1* | 12/2019 | Yamazaki | G06V 20/52 |
| 2020/0184968 A1* | 6/2020 | Han | H04R 1/323 |
| 2020/0285856 A1* | 9/2020 | Chan | G06N 3/044 |
| 2022/0139199 A1* | 5/2022 | Miwa | G08B 21/182 340/573.1 |
| 2022/0292170 A1* | 9/2022 | Khadloya | G06F 18/22 |
| 2022/0292614 A1* | 9/2022 | Georges | G06Q 50/26 |
| 2023/0105423 A1* | 4/2023 | Deshmukh | G06V 10/25 348/154 |

* cited by examiner

Primary Examiner — Daniel T Tekle
(74) Attorney, Agent, or Firm — FINNEGAN, HENDERSON, FARABOW, GARRETT & DUNNER LLP

(57) ABSTRACT

The present invention provides a robust and effective solution to an entity or an organization by enabling them to implement a system for facilitating intruder detection that is highly accurate especially for enhancing critical security zones, the intruder detection system (IDS) can provide high true positives and extremely low false positives, the system may be developed using techniques from artificial intelligence and computer vision and is focused on highly optimized intruder detection with equal attention paid to both accuracy and speed, the area of use is highly diverse and can be used mainly for surveillance and security purposes, be it right from outdoor areas such as perimeter walls, campuses to indoor areas such as malls, factory floors, and the like.

18 Claims, 13 Drawing Sheets

700A

700B

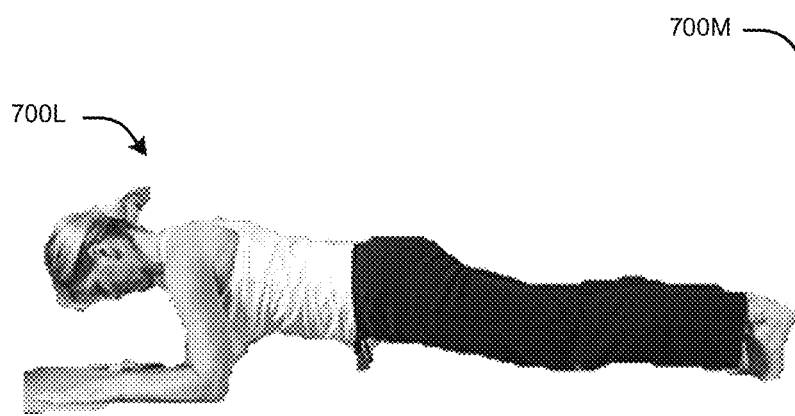
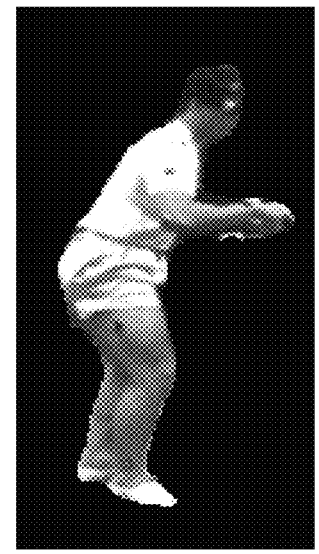
FIG. 7L    FIG. 7M
FIG. 7N

SYSTEM AND METHOD OF INTRUDER DETECTION

FIELD OF INVENTION

The embodiments of the present disclosure generally relate to facilitating surveillance and security purposes. More particularly, the present disclosure relates to a system and method for facilitating highly optimised intruder detection right from outdoor areas such as perimeter walls, campuses to indoor areas such as malls, factory floors, and the like for enhancing critical security zones.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

An intruder detection system (IDS) is a device or software application that monitors an area for malicious activity of intruders. Most of the current intrusion detection approaches include heavy deployment of complex sensing infrastructures, including vision-based (e.g., cameras) and environmental motion-based (e.g., light, proximity and heat sensors) systems, which continuously observe changes relating to or arising from the surrounding environment and detect abnormal events and activities.

The existing sensor-based approaches burden excessive deployment and heavy device/labor expenses to their users and demand constant maintenance and control services. Moreover, many vision based surveillance systems do not work with any type of camera feed and are camera specific. Most security systems design an automatic security system for a unit to detect any entrance to the area's gateways, which is usually captured by a sensing device-oriented infrastructure installed in the environment. Presence of intruders in a home, office, or other occupied areas can be difficult to ascertain, especially when authorized people (e.g., homeowners, children, etc.) and/or pets are in the area. Typical burglar alarm systems attempt to monitor points of entry into a building (e.g., doors, windows, etc.). If an intruder is able to gain access to the building without activating the point of entry monitor, then the intruder may go undetected. Some burglar alarm systems try to overcome the weaknesses of point-of-entry monitors by using motion detectors. However, such motion detectors are generally not used when people are present, or are used in un-occupied areas (e.g., non-sleeping areas) during night time. However, motion detectors can trigger false alarms due to motion of pets, air currents, etc. Most intruder detection systems are not accurate and have extremely low true positives and high false positives. According to the Scaled Yolo-V4 family is based on the CSP approach which scales both up and down and is applicable to small and large networks while maintaining optimal speed and accuracy. The YOLOv4-CSP model achieves near state of the art results 47.5% AP (66.2 AP50) for the MS COCO dataset at speed of 60 fps on Nvidia T4. This is currently the highest accuracy on the COCO dataset among any published work. Further In this document, the Scaled Yolo-V4 CSP model is used for running detection. However, these models are trained only on the COCO dataset which is an 80-class object detection dataset and focuses more only on the detection of humans.

Also, in existing systems, for a plurality of intruders, plurality of tubelets have to be logged. For example, each frame may be saved multiple times with different bounding boxes saved over the frames. This processing is costly in terms of time and resources and can make the detection lag behind. Moreover, modern ML based detectors in general are prone to incorrect detections. Thus, relying on just one frame's detection is not enough. Already available online Trackers heavy to use and can't recover from missed detections. 'Improving Video Object Detection by Seq-Bbox Matching' is a novel light weight multiframe logic which can recover from missed detections. The method links detections across multiple frames based on IoU. Each of these links across multiple frames is called a Tubelet. The method maintains individual tubelets for each of the detected persons. However, it only runs in an online setting. The method also does not measure the motion of the object which can further help with reducing false positive rate.

There is, therefore, a need in the art to provide a system and method that can facilitate highly optimised intruder detection with equal attention on both accuracy and speed of the system.

OBJECTS OF THE PRESENT DISCLOSURE

Some of the objects of the present disclosure, which at least one embodiment herein satisfies are as listed herein below.

It is an object of the present disclosure to provide an intruder detection system that is highly accurate and provides high true positives and extremely low false positives.

It is an object of the present disclosure to provide an intruder detection system that makes sure that even if a part of the body of the intruder is present in a critical zone/region of interest (ROI), an alarm should be raised.

It is an object of the present disclosure to provide an intruder detection system that enables raising of extremely fast intruder alerts even without the requirement of almost the entire body needed to be a part of the ROI to raise an alarm.

It is an object of the present disclosure to provide an intruder detection system that can work agnostically with any type of camera feed i.e. both RGB and IR light.

It is an object of the present disclosure to provide an intruder detection system that does not require any manual intervention to make sure that the intruder detection system works with both types of camera feeds.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for facilitating detection of one or more intruders in and around an entity. The system may include a plurality of camera sensors operatively coupled to one or more processors, wirelessly coupled to the plurality of camera sensors through a network. The processor may be coupled with a memory that may store instructions which when executed by the processor may cause the system to receive a plurality of video streams from the plurality of camera sensors, extract, by an artificial intelligence (AI) engine, a first set of attributes from each video stream, the first set of attributes pertaining to an image associated with a combination of region of interest (ROI) and a buffer zone. In the AI engine may be associated with the one or more processors. Based on the extracted first set of attributes, correlate, by the AI engine, the first set of attributes extracted with a knowledgebase having an image background of the ROI and the buffer zone; and, detect, by a detection processing module, presence of one or more intruders based on the correlation of the first set of attributes and the knowledgebase. In an embodiment, the detection processing module may be associated with the one or more processors.

In an embodiment, an input module associated with the AI engine may receive from a user a first set of parameters associated with the plurality of camera sensors, the first set of parameters may pertain to directional parameters of the plurality of camera sensors to direct the plurality of camera sensors towards the ROI and the buffer zone.

In an embodiment, on detection of the one or more intruders, the system may alert the entity about a possible intrusion at the ROI and the buffer zone.

In an embodiment, the one or more intruders may include any moving object, a person, an animal, an immobile object, and any suspicious object.

In an embodiment, the AI engine may process a plurality of video frames present in the video streams received from the plurality of camera sensors at real time.

In an embodiment, the AI engine may be associated with an online multi-frame logic (OML) module that may calculate an instantaneous velocity of the one or more intruders.

In an embodiment, the system may be further configured to: generate, by the detection processing module, a bounding box for each intruder detected; and send, by the detection processing module, the bounding box for each intruder to the online multiframe logic module.

In an embodiment, the system may be further configured to link, by the OML module, one or more detections associated with the bounding box for each intruder across a plurality of video frames received from the plurality of camera sensors.

In an embodiment, the system may be further configured to: determine, by the OML module, missed one or more detections across the plurality of video frames, based on the determination of missed one or more detections, improve, by the OML module, true positives associated with the one or more detections and reduce the number of false positives associated with the missed one or more detections.

In an embodiment, the system may be further configured to: measure, by the OML module, velocity of each intruder enabling more control and have additional criteria for raising alarms.

In an embodiment, the system may be further configured to instantly detect, by the AI engine, the one or more intruders, even when only a part of the body of the one or more intruders is present in the ROI.

In an embodiment, the system may be further configured to be agnostic to the type of video streams from the plurality of camera sensors being input to the system. In another embodiment, a feed checking and model switching module associated with each camera sensor may be used to process the plurality of video frames based on the type of the camera sensor feed.

In an embodiment, the system may be further configured to log a plurality of stats such as alarm stats, camera stats, and individual tubelets associated with the detection of the one or more intruders.

In an aspect, the present disclosure provides for a user equipment (UE) for facilitating detection of one or more intruders in and around an entity. The UE may include a plurality of camera sensors operatively coupled to one or more processors, wirelessly coupled to the plurality of camera sensors through a network. The processor may be coupled with a memory that may store instructions which when executed by the processor may cause the UE to receive a plurality of video streams from the plurality of camera sensors, extract, by an artificial intelligence (AI) engine, a first set of attributes from each video stream, the first set of attributes pertaining to an image associated with a combination of region of interest (ROI) and a buffer zone. In the AI engine may be associated with the one or more processors. Based on the extracted first set of attributes, correlate, by the AI engine, the first set of attributes extracted with a knowledgebase having an image background of the ROI and the buffer zone; and, detect, by a detection processing module, presence of one or more intruders based on the correlation of the first set of attributes and the knowledgebase. In an embodiment, the detection processing module may be associated with the one or more processors.

In an aspect, the present disclosure provides for a method for facilitating detection of one or more intruders in and around an entity. The method may include the steps of receiving, by one or more processors, a plurality of video streams from a plurality of camera sensors operatively coupled to one or more processors (202), wirelessly coupled to the plurality of camera sensors through a network. The one or more processors may be coupled with a memory that may store instructions executed by the one or more processors. The method may further include the step of extracting, by an artificial intelligence (AI) engine, a first set of attributes from each video stream, the first set of attributes pertaining to an image associated with a combination of region of interest (ROI) and a buffer zone. In an embodiment, the AI engine may be associated with the one or more processors. Based on the extracted first set of attributes, the method may include the step of correlating, by the AI engine, the first set of attributes extracted with a knowledgebase having an image background of the ROI and the buffer zone; and, detecting, by a detection processing module, presence of the one or more intruders based on the correlation of the first set of attributes and the knowledgebase. In an embodiment, the detection processing module may be associated with the one or more processors.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to implement a system for facilitating intruder detection that is highly accurate especially for enhancing critical security zones. The intruder detection system (IDS) can provide high true positives and extremely low false positives. The system may be developed using techniques from artificial intelligence and computer vision and is focused on highly optimised intruder detection with equal attention paid to both accuracy and speed. The area of use is highly diverse and can be used mainly for surveillance and security purposes, be it right from outdoor areas such as perimeter walls, campuses to indoor areas such as malls, factory floors, and the like.

Figure 1:
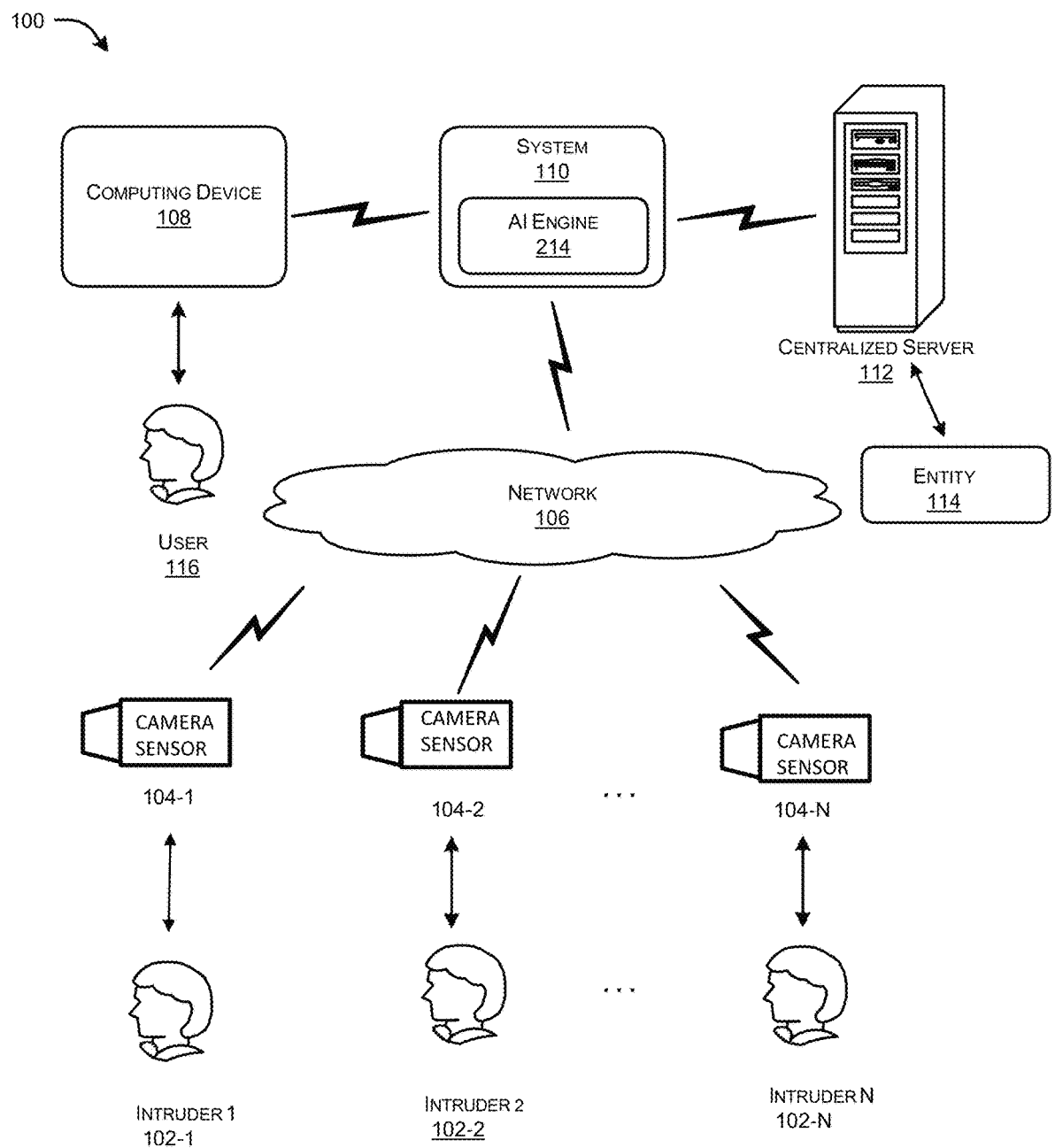
FIG. 1 illustrates an exemplary network architecture in which or with which the system of the present disclosure can be implemented, in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated in FIG. 1, by way of example and not limitation, the exemplary architecture (100) may include a plurality of camera sensors (104-1, 104-2, . . . 104-N) (hereinafter interchangeably referred as camera sensor 104 and collectively referred to as camera sensors 104) to capture video streams that may include one or more intruders (102-1, 102-2, . . . 102-N) hereinafter interchangeably referred as intruder 102 and collectively referred to as intruders 102) in one or more video frames when the intruders (102) approach a predefined vicinity of an entity (114). The exemplary network architecture (100) may further include one or more users (116) (hereinafter interchangeably referred as user 116 and collectively referred to as users 116). Each user may be associated with at least one computing device (108) (hereinafter interchangeably referred as a computing device 108 and collectively referred to as computing devices 108 or user equipments 108). The users (116) may interact with the system (110) by using their respective computing device (108). The computing device (108) and the system (110) may communicate with each other over a network (106). The system (110) may be associated with a centralized server (112) that may further associated with the entity (114). Examples of the computing devices (120) can include, but are not limited to a smart phone, a portable computer, a personal digital assistant, a handheld phone, a laptop, a smart TV, a set top box (STB), a mobile phone and the like. The entity may be any business organisation, a university, a public place, a government organisation, a bank, a school, any education organisation but not limited to the like.

More specifically, the exemplary architecture (100) includes a system (110) equipped with an artificial intelligence (AI) engine (216) for facilitating detection of the intruders (102). The system (110) can be operatively coupled to the camera sensors (104) configured to detect presence of any intruder. In an exemplary embodiment, the camera sensors (104) can include one or more cameras, webcams, RGB cameras, IR cameras but not limited to the like. The system (110) can receive a plurality of video streams from the plurality of camera sensors (104). The plurality of video streams may include the predefined vicinity of the entity (114), the predefined vicinity may include a region of interest (ROI) and a buffer zone.

The system (110) may include a database (210) that may store a knowledgebase having background of the ROI and the buffer zone. The computing device (108) may be communicably coupled to the centralized server (112) through the network (106) to facilitate communication therewith. The computing device (104) may be operatively coupled to the centralized server (112) through the network (106). In an embodiment, the AI engine (216) of the system (110) may extract a first set of attributes from each video stream pertaining to an image associated with a combination of the ROI and the buffer zone. Based on the extracted first set of attributes, correlate the first set of attributes extracted with the knowledgebase having an image background of the ROI and the buffer zone. The system (110) may further be configured to detect, by using a detection processing module (216), presence of one or more intruders based on the correlation of the first set of attributes and the knowledgebase.

In an embodiment, an input module may be associated with the AI engine (214) and may receive from a user (116) a first set of parameters associated with the plurality of camera sensors (104). In an embodiment, the first set of parameters pertain to directional parameters of the plurality of camera sensors to direct the plurality of camera sensors towards the ROI and the buffer zone.

In an embodiment, on detection of the intruders, the system (110) may alert the entity (114) about a possible intrusion at the detected ROI and the buffer zone.

In an exemplary embodiment, the one or more intruders may include any moving object, a person, an animal, an immobile object, any suspicious object but not limited to the like.

In an exemplary embodiment, the AI engine (216) may process a plurality of video frames received from a plurality of camera sensors at real time.

In an embodiment, the AI engine (216) may further include an online multiframe logic (OML) module with instantaneous velocity calculation. In an exemplary embodiment, the detection processing module generates a bounding box for each intruder detected and may be then send to the online multiframe logic module to link detections across a plurality of video frames received from the plurality of camera sensors. As such, missed detections across the plurality of frames may be avoided which further may improve true positives and also reduces the number of false positives. The multiframe logic module may further be configured to measure velocity of the intruder enabling more control and have additional criteria for raising alarms.

In an exemplary embodiment, the buffer zone functionality may be provided by the AI engine (216) for instant detections even when only a part of the body may be present in the region of interest. It is not necessary for the entire or majority of the intruder's body to be inside the ROI. The buffer zone frames may also be sent to the OML for further processing.

In an exemplary embodiment, the system (110) may be configured to be agnostic to the type of camera feed being input to the system (110). The input can be RGB or IR or a combination thereof. In each case, we have a feed checking and model switching module which helps in robust intruder detection.

In an exemplary embodiment, the system (110) may log a plurality of stats such as alarm stats, camera stats, individual tubelets and the like. Logging is important for investigating any undesirable/unexpected behaviour by the code. For example, alarm stats may include all of the alarms raised and details about the API call such as: the timestamp at which the alarm was called, response time and message, a snapshot of the frame which triggered the alarm and the like.

In a way of example and not as a limitation, for the camera stats, each camera may include FPS that may be logged every 2 minutes but not limited to it. If FPS drops below at least 20, a warning may be logged that is not dependent on 2 min timer but is instantaneous. Every 2 minutes stream status may be logged, offline or online.

In a way of example and not as a limitation, for the Individual Tubelets, each detected tubelet may be individually stored in each respective folder. Each folder may have all of the frames with bounding boxes drawn over.

In an exemplary, the logging process may be at least two step logging process. For example, in case of detection where one or more intruders are detected in the frame, the frame may be saved in the disk with a frame_id of the frame in the name and the detection may be stored in a text file. A secondary script may read the text file and generates the final tubelet folders. This ensures that the log generation may be independent of the main detection process thus any failures/lag in logs does not affect the main process.

In an exemplary embodiment, the system may perform a volume-based detection instead of a line based detection but not limited to the like.

In an embodiment, the computing device (108) may communicate with the system (110) via set of executable instructions residing on any operating system, including but not limited to, Android™, iOS™, Kai OS™ and the like. In an embodiment, computing device (108) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, a smart TV, a Set Top Box (STB) or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, a network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
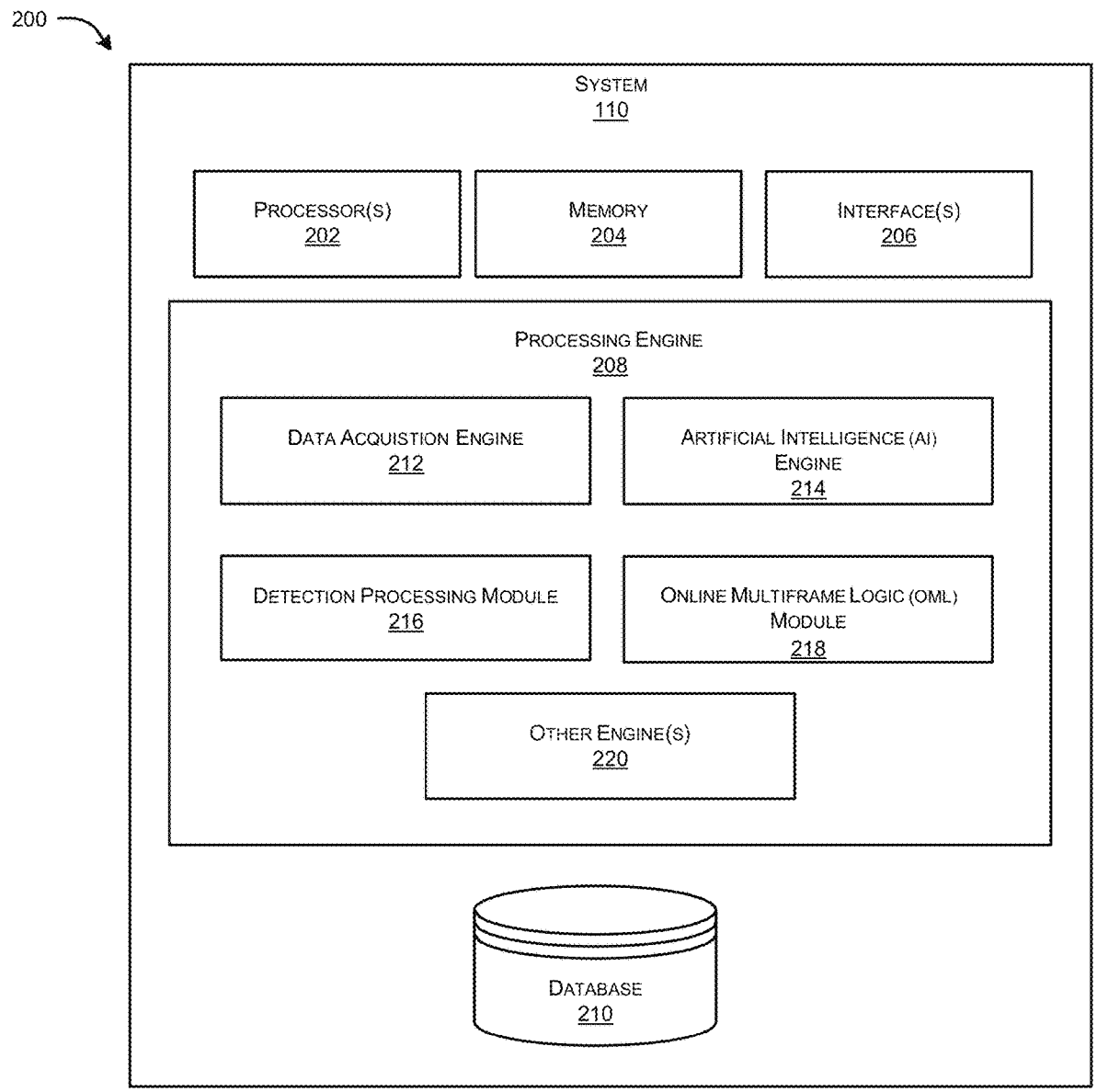
FIG. 2 illustrates an exemplary representation of system or a centralized server, in accordance with an embodiment of the present disclosure.

In an embodiment, the system (110) may include one or more processors coupled with a memory, wherein the memory may store instructions which when executed by the one or more processors may cause the system to detect intruders in a vicinity of an entity. FIG. 2 with reference to FIG. 1, illustrates an exemplary representation of system (110)/centralized server (112) for facilitating intruder detection based on an artificial intelligence-based architecture, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the system (110)/centralized server (112) may include an interface(s) 204. The interface(s) 204 may comprise a variety of interfaces, for example, interfaces for data input and output devices, referred to as I/O devices, storage devices, and the like. The interface(s) 204 may facilitate communication of the system (110). The interface(s) 204 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition engine (212), an artificial intelligence engine (214), a detection processing module (216), an online multiframe logic (OML) module (218) and other engines (220). The other engines may include, an alert generation module and other processing modules.

Figure 3:
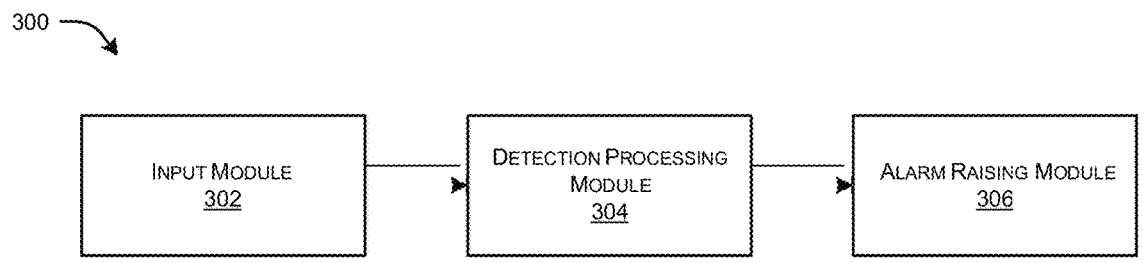
FIG. 3 illustrates exemplary method flow diagram (300) depicting a method for facilitating intruder detection, in accordance with an embodiment of the present disclosure.

FIG. 3 illustrates exemplary method flow diagram (300) depicting a method for facilitating intruder detection, in accordance with an embodiment of the present disclosure. As illustrated, the method flow has at least three modules such as an input module (302), a detection processing module (304) and an alarm raising module (306).

In an exemplary embodiment, the input module (302) may have the following functionalities:
The details of the camera such as IP address, and the like may be input by a user in the frontend.
Post this, the user may select the region of interest and the buffer zone from the camera feed.
The details may be then sent to the detection processing module after the camera has been onboarded and is ready for running the detection of intruders.

In an exemplary embodiment, the detection processing module (304) may perform the following functionalities:
The frames from one or more camera sensors may be sent to the pre-processing component.
The pre-processing component makes the frames ready in the format to be input to the AI-based detection model and then batched together.
First, it is checked whether the feed being input is either RGB or IR using feed checking sub-module which decides whether the frames need to be sent either to the RGB or IR intruder detection AI model.
Once the frames are passed to the AI model, detection outputs in the form of bounding boxes and confidence scores may be obtained in case an intruder is present in the region of interest. The outputs may be also run through a post processing algorithm after which the outputs are sent to the alarm raising module.

In an exemplary embodiment, the Alarm Raising module may provide the following functionalities:
The main component of the Alarm raising module is the online multiframe logic (OML) submodule which decides whether an alarm can be raised or not.
For each onboarded camera, a new instance of OML is created.
Every detection output is passed to this instance and the results are aggregated only if the detection lies in the buffer zone/Region of interest.
Based on the calculations/algorithm performed on the aggregated detection results, an alarm raising request for the intruder is generated.

Figure 4A:
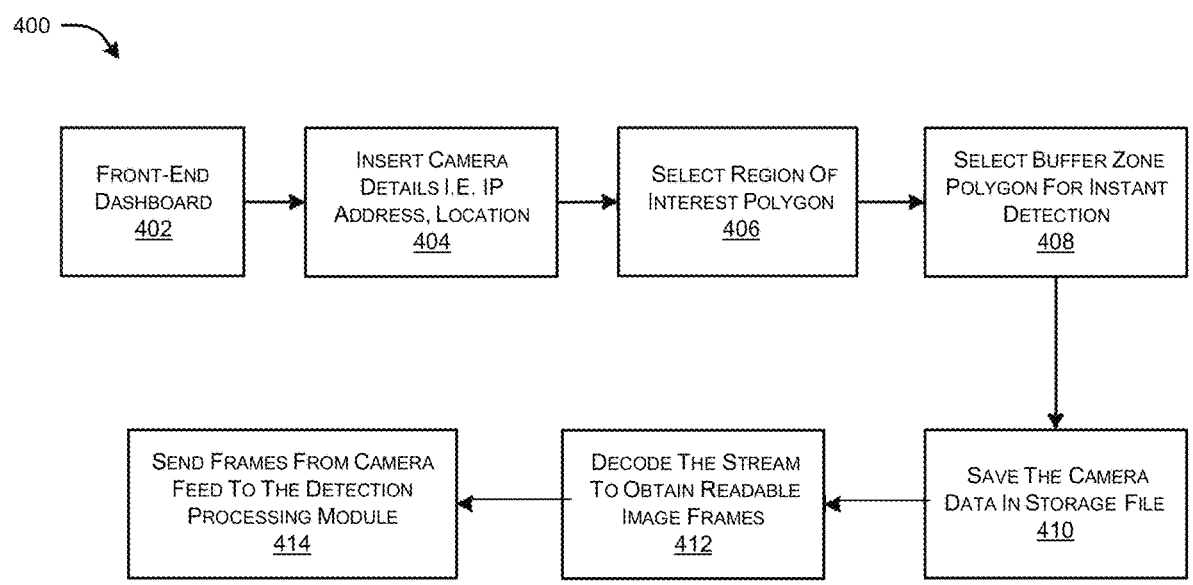
FIGS. 4A-4D illustrate exemplary representations of flow diagrams and its implementation, in accordance with an embodiment of the present disclosure.

FIGS. 4A-4D illustrate exemplary representations of flow diagrams and its implementation, in accordance with an embodiment of the present disclosure. FIG. 4A, in an aspect, illustrates flow of the input module. The input module may enable at 402 onboarding a camera from a front end dashboard from which at 404 inserting camera details such as IP address, location and the like and at 406, selecting a region of interest may be configured. At 408 instant detection is enable by selecting a buffer zone and then at 410 storing camera data in storage device or file. At 412, the input module may involve decoding the camera data to obtain readable image frames and at 414, pushing the frames to the detection processing module.

Figure 4B:
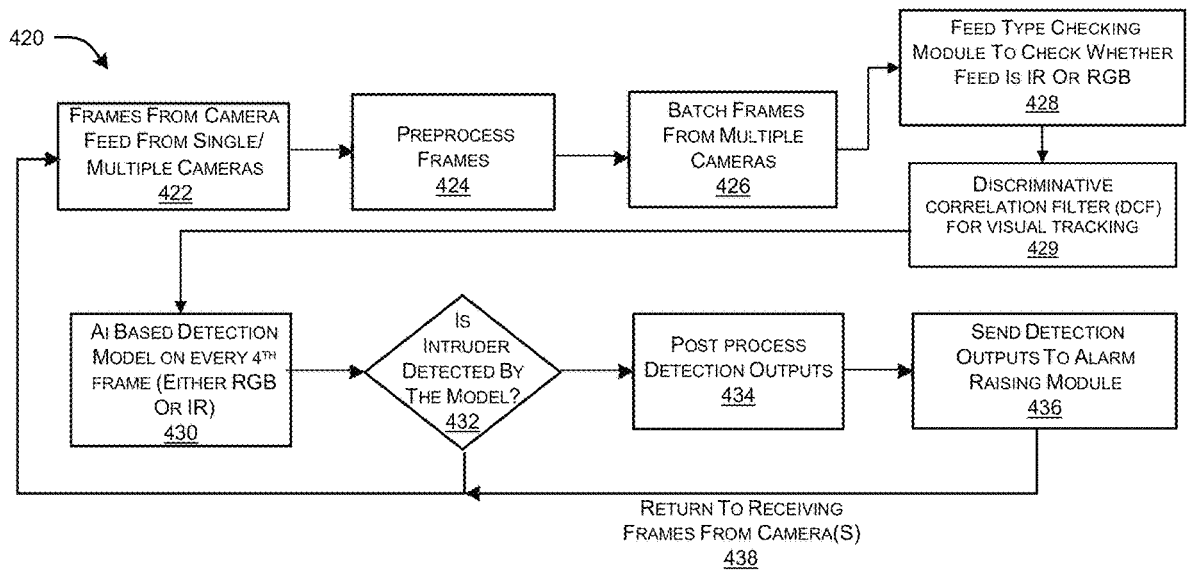

FIG. 4B illustrates a flow diagram describing the working of the detection processing module and may include the step at 422, receiving a plurality of frames from camera feed from one or more cameras, and at 424 pre-processing of frames. At 426, the detection processing module may include batching the frames from the one or more cameras and at 428, checking feed type module to check whether feed is IR or RGB. At 430, the detection processing module may include AI based mode, modelling of IR or RGB feed. If at 432, Intruder is detected by the model, at 434, post processing detection outputs. In an exemplary embodiment, the post processing of the images may be done to obtain more information. For example, after inference the detections do not correspond to real pixel coordinates. To obtain coordinates anchoring has to be done. Anchoring involves looping over each detection and applying a fixed function to it. For example, to avoid excessive post processing time, numba was used for anchoring. This gives much faster post processing times (~10x) when compared with native python. Anchoring is followed by Non max suppression (NMS) which removes redundant detections and gives final output detections.

At 436, the detection processing module may include, sending detection outputs to alarm raising module. The alarm raising module is responsible for taking the detection outputs from the detection processing module and passing it to the online multiframe logic (OML) submodule. If OML suggests that it is an actual intruder detection, an alarm request is raised. If at 434, intruder is not detected then at 438, returning to receive frames from the camera.

Figure 4C:
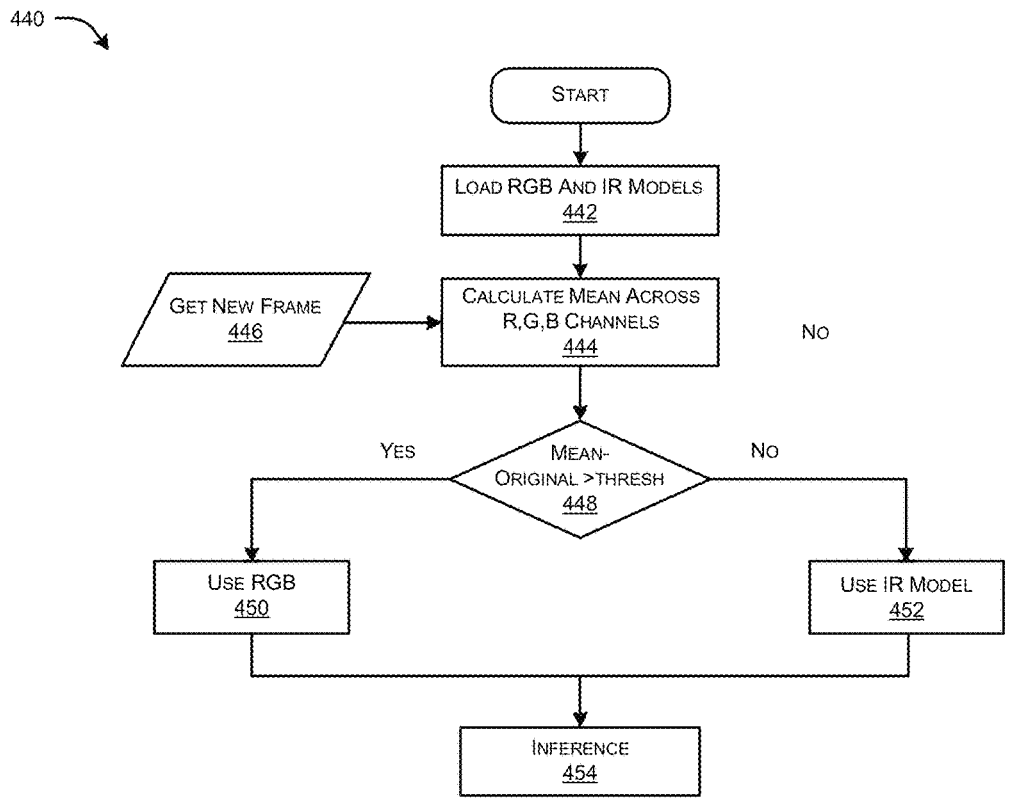

FIG. 4C illustrates flow diagram of feed type checking submodule and may include at step 442, loading of RGB or IR models. The system may work independent of the lighting conditions and fee provided by the camera i.e. either RGB or IR feeds.

The feed type checking submodule may include at 444, calculating mean R, G, B channels and getting new frames at 448. If at 450, the difference between mean and original value is greater than a threshold value, then at 448, RGB model may be used. If the difference between mean and original value is less than the threshold value, then at 452, IR model may be used. For example, during daytime, the cameras stream RGB frames and some cameras switch to IR to capture objects at low light. At least two different models may be used to detect intruders in these two different conditions. The system may automatically detect if the video stream switch to IR and may start detecting with the IR model and switch back to RGB and start detecting with the RGB model.

In an exemplary embodiment, the two models follow the same network structure but may be trained differently to get the best accuracy on the different use cases. The two models may be loaded into the GPU when the streams are added. There will be a thread running for each stream, which checks for every 5 seconds whether frames that are being streamed are IR or RGB. It changes the model if the RGB shifts to IR or IR shifts to RGB. The feed type is checked by comparing the mean of the channel values to each of the channel value.

Figure 4D:
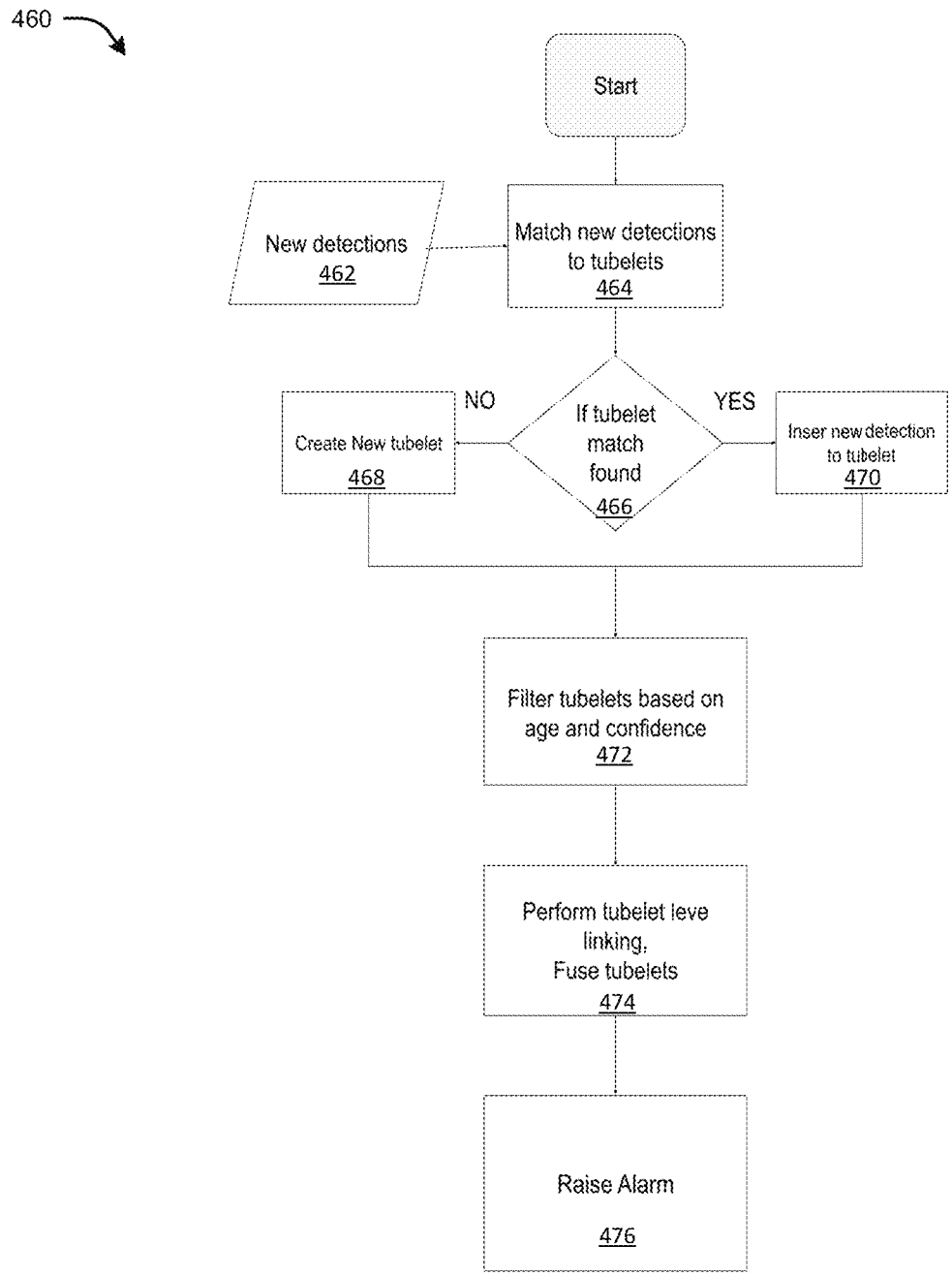

FIG. 4D illustrates flow diagram of Online Multiframe logic wherein the existing algorithm to run in an online setting may be modified while being able to recover from missing detections. The OML may further have an extra functionality to measure velocity of the moving object to have more control and have additional criteria for raising alarms.

In an embodiment, the OML (460) may at 462 obtain new detections and match new detections with existing tubelets at 464. The OML may further at 470 Insert new detections to matched tubelets if the tubelet match was found at 466. If the tubelet match was not found at 466, then the OML may create a new tubelet at 468. The OML at 472 may then filter the tubelets based on age and confidence. At 474 the OML may perform tubelet level linking and fuse the tubelets and then at 474, raise an alarm. In a way of example and not as a limitation, the algorithm for OML may be given by 1: Match the new detections with existing tubelets
2: Insert new detections to matched tubelets
3: For the detections that don't have a match start a new tubelet
4: ≥ If mean velocity>=velocity−thresh then
⇐has moved<=True
6: end if
7: Delete all tubelets that are:
8: Older than n frames
9: Have mean conf.<mean conf threshold
10: Perform Tubelet-level Bbox Linking
11: Fuse matched tubelets An algorithm for matching new detections with existing tubelets may be given by In an exemplary implementation, the following TABLE highlights the tubelet data structure

| Variable | data type | Description |
|---|---|---|
| tubelet id | string | Unique ID to identify a tubelet. DateTimeof the first detection is used as tubelet ID. |
| bbox list | list of list | A list of all detected bounding boxes in the format: ([x1, y1, x2, y2]). x1, y1 are the pixel coordinates of the top left corner of the bounding box. x2, y2 are the pixel coordinates of the bottom right corner of the bounding box. The last detection is used to link new detected bounding boxes |
| mean conf | float | A running average of confidence to avoid drastic change dues to one detection having very low or very high confidence. |
| first frame id | int | The frame number from which the tubeletstarts. |
| last frame id | int | The frame number of the last frame fromin the tubelet. |
| current velocity | float | Current instantaneous velocity calculatedover past n frames(configurable) The velocity is scale invariant as it is calculated as a proportion of the diagonal ofthe bounding box |
| has moved | boolean | A boolean thats changed to true if the current velocity crosses a threshold. Once set to true the variable is never again unset. |

In an embodiment, a distance metric used in above algorithm, reciprocal of Intersection over Union a metric commonly used in segmentation. It is scale invariant thus works for both further and closer objects:

$$\text{Distance} = 1/\text{similarity} = 1/IoU \qquad (1)$$

$$IoU = \frac{TP}{TP + FP + FN} \qquad (2)$$

In another embodiment, once new detections are matched with existing tubelets those detections have to be inserted into the respective tubelets and properties for the tubelets have to be updated. Every time a new detection is inserted to a tubelet the following values are modified:

Input: I bboxes detected in previous frame and J bboxes detected in current frame
    Distance_matrix=create_matrix (I,J)
      For i=1 to I do
      For j=1 to J do
        Set distance_matrix (I,j) to distance between I th bbox of
        previous frame of previous frame and jth bbox of current
        frame
      End for
    End for
    Set pairs to empty list
    Repeat
      Set I,j to line, column of minimum value in distance_matrix
      Add (I,j) to paira
      Set i-th line of distance_matrix to infinity
      Set j-th column of distance_matrix to infinity
    Until minimum value of distance_matrix is infinity
    Output: pairs bbox list: The new detection is appended at the end of bbox list mean conf: The mean confidence is updated with:

$$\text{mean } conf_{i-1} = \frac{\text{mean } conf_{i-1} * \text{tubelet } len_{i-1} + conf_i}{\text{tubelet } len_i} \quad (3)$$

last frame id: Updated to current frame number.
current velocity: Current velocity is L2 norm of mean of instantaneous velocity over past n frames. The exact velocity calculation is explained in the next sub section.

$$v_t = \left\| \frac{\sum_{i=0}^{n} \text{inst\_v}_{t-i}}{n} \right\|_2$$

has moved: If current velocity greater than or equal to velocity threshold. The has moved variable is set to True.

In an embodiment, the IDS Detectors may be prone to get false positives in poor lighting or in areas of vegetation. While lot of these are not consistent enough to create a consistent tubelets in some areas some small objects might resemble a person. Usually, these small objects are stationary. One way to reduce these False positive casesis to measure movement for the object.

In an exemplary embodiment, instantaneous velocity calculation may be used to remove false positives.

For example, velocity is measured as $L_2$ norm of mean of instantaneous velocity over past n frames (eq. 4). Here instantaneous velocity is a vector. This is important as a stationary object might have slight changes in centers from time to time thus might accumulate motion, which is not desirable. In case of vectors these slight changes with cancel out. The instantaneous velocity is measured in X and Y directions as pixel distances between two consecutive frames, normalized by the pixel length of the diagonal of latest detection bounding box. The normalization makes the velocity scale invariant, this allows to have one velocity threshold and range for objects at any distances.

$$D(\text{diagonal length}) = \sqrt[2]{w^2 + h^2} \quad (5)$$

$$\text{inst } v_t = \frac{(X_t, Y_t) - (X_{t-1}, Y_{t-1})}{D} \quad (6)$$

Detectors commonly miss some intermediate frames of detections. This could cause tubelet links to be broken. To avoid this older tubelets are checked for match with current running tubelets and are fused. As shown in the FIG. 4E, If our detector misses a few detections our algorithm matches the last detection from older tubelet with first detection of newer tubelet and fills in the inter-mediate missing detection using linear interpolation. Thus fusing 2 tubelets to one.

In an exemplary embodiment, to identify such tubelets that can be of the same object (person), then taking all existing tubelets in the memory and for all tubelet pairs $t_i$, $t_j$ and check if the last detection from t; matches with the first detection of tubelet $t_j$. It is ensured that last frame id($t_i$) first frame id($t_j$)). And that the difference between both the frame ids is within n, a configurable number.

Suppose if match between two tubelets $t_i$ and $t_j$ is found the tubelets have to be fused tu come a single tubelet. Suppose last frame id($t_i$)<first frame id($t_j$) the following updates would be made to $t_i$:

bbox list: The intermediate frame detections are stored in a list, inter_bbox_list_of_size: first_frame_id($t_j$)-last_frame id($t_i$). The elements in the list are filled linearly interpolating from last detection of $t_i$ and last detection of $t_j$ as follows:

$$\alpha = \frac{\text{frame } no - \text{last frame } id(t_i)}{\text{first frame } id(t_j) - \text{last frame } id(t_i)} \quad (7)$$

$$idx = \text{frame } no - \text{last frame } id(t_i) \quad (8)$$

$$\text{inter } bbox \text{ } list_{idx} = bbox \text{ } list \text{ } (t_i)[-1] * (1 - \alpha) + bbox \text{ } list \text{ } (t_j)[1] * \alpha \quad (9)$$

The three boxes are then appended one after the other to form one complete list:

$$\text{bbox list}(t_i) = \text{bbox list}(ti) + \text{inter bbbox list} + box \text{ list}(tj) \quad (10)$$

mean conf: The mean confidence is updated with:

$$\text{mean } conf(t_i) = \frac{\text{mean } conf(t_i) * \text{tubelet } len \text{ } (t_i) + \text{mean } conf(t_j) * \text{tubelet } len \text{ } (t_j)}{\text{tubelet } len \text{ } (t_i) + \text{tubelet } len \text{ } (t_j)} \quad (11)$$

first frame id: First frame ID is kept same for the tubelet ti:
last frame id: Last frame ID of the fused tubelet is taken from tubelet tj:

$$\text{last frame } id(t_i) = \text{last frame } id(t_j) \quad (12)$$

current_velocity: Current velocity
has moved: is set to True is either of has moved (ti) or has moved (tj) is set to True.

In an exemplary embodiment, after tubelet insertion, itering and Fusion is done. Each of the tubelet is checked if it is in ROI AND has moved by checking has moved variable) AND if tubelet length greater than or equal to threshold.

In an exemplary embodiment, the raise an alarm module may maintain a list of timers for each tubelets is maintained and each tubelet sends a alarm signal after its timer runs out. The timer is then reset again thus raising alarms at regular intervals.

Figure 5:
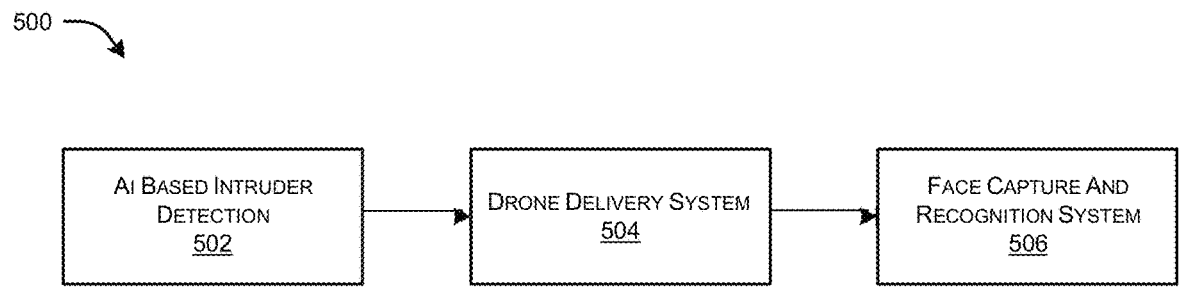
FIG. 5 illustrate exemplary flow diagrams representing the AI based detection system, in accordance with an embodiment of the present disclosure.

FIG. 5 illustrate exemplary flow diagrams representing the AI based detection system, in accordance with an embodiment of the present disclosure. The core of the intruder system may be an AI-Based Human detection model (502). The main requirements of such a model are that the system needs to run real-time as well as be able to be highly accurate to detect intruders at far distance as well as with different traffic profiles. The AI based human detection system (502) may be coupled to a drone delivery system (504) and a face capture and recognition system (506) that may additionally heighten the scope of surveillance and security provided even further.

In an exemplary embodiment, the drone delivery system (504) may be based on the bounding box coordinates obtained from the human detection system, the actual geographical coordinates may be calculated. For example, using the four bounding box coordinates, the latitude and longitudinal information of the intruder may be estimated based on the latitude and longitude range of the area covered by the field of view of the camera. Once the real-world coordinates are calculated, an alarm will be sent to the drone delivery system to dispatch a drone fitted with a camera. This drone upon reaching the fixed location of the intruder will perform facial recognition analysis.

In an exemplary embodiment, the face recognition system (506), may be activated by the drone delivery system (504). For example, the drone delivery system (504) upon reaching the fixed location of the intruder will perform facial recognition analysis. The steps for facial recognition may include
  a) Performing face detection based on face key points.
  b) Obtaining the crop of the face detected.
  c) Using this crop and run a search on the intruder database.
  d) If a match is found, raising an alarm with the name of the intruder, else adding the face of the intruder as a new entity in the database.
  e) Additionally, searching every intruder in a global checklist for high level security targets.

The AI based human detection system (502 may be based on a CSP approach which scales both up and down and is applicable to small and large networks while maintaining optimal speed and accuracy. The next task in hand was to choose and build datasets for the specific task. While certain datasets have a large number of images, most of them have a close up view of a person/group of people. Thus, a Dataset created from videos from actual location video footage was taken. The dataset was created to train, test and benchmark the model on how well it performs on detecting intruders accurately. Some videos were collected using cameras at RCP at different locations.

The dataset is further classified into three categories based on bounding box size of the person/object in the frame. There is a text file corresponding to each image. In each text file, there are n lines representing n bounding boxes in that corresponding image (n is some non-negative integer). For example, each line contains 5 values separated by spaces<class id><x center><y center><width><height>. These are then normalized to the images height and width. Class id is 0 for every bounding box because there is only one class which is "person".

In an exemplary embodiment, a detailed training scheme was prepared and at least 80-90 combinations were trained. The training models include an RGB model and an IR model.

In an exemplary embodiment, the RGB model may be trained for 300 epochs in pytorch format with adam as optimizer and with a resolution of 1280*1280 and following are the hyperparameters
  lr0: 0.01 #initial learning rate (SGD=1E-2, Adam=1E-3)
  momentum: 0.937 #SGD momentum/Adam beta1
  weight_decay: 0.0005 #optimizer weight decay 5e-4
  giou: 0.05 #GIoU loss gain
  cls: 0.5 #cls loss gain
  cls_pw: 1.0 #cls BCELoss positive_weight
  obj: 1.0 #obj loss gain (scale with pixels)
  obj_pw: 1.0 #obj BCELoss positive_weight
  iou_t: 0.20 #IoU training threshold
  anchor_t: 4.0 #anchor-multiple threshold
  fl_gamma: 0.0 #focal loss gamma
  hsv_h: 0.015 #image HSV-Hue augmentation (fraction)
  hsv_s: 0.7 #image HSV-Saturation augmentation (fraction)
  hsv_v: 0.4 #image HSV-Value augmentation (fraction)
  degrees: 0.0 #image rotation (+/−deg)
  translate: 0.5 #image translation (+/− fraction)
  scale: 0.5 #image scale (+/−gain)
  shear: 0.0 #image shear (+/−deg)
  perspective: 0.0 #image perspective (+/− fraction), range 0-0.001
  flipud: 0.0 #image flip up-down (probability)
  fliplr: 0.5 #image flip left-right (probability)
  mixup: 0.0 #image mixup (probability)

Other modes of training were also done using multiscale training, rectangular training and SGD as optimizer. But maximum Map is attained by above mentioned parameters and hyperparameters.

In the IR model, images may be converted to grayscale format from RGB and trained with above mentioned hyperparameters. In an embodiment, the IR model was trained for 300 epochs with a resolution of 1280*1280 but not limited to it.

Figure 6:
FIG. 6 illustrates exemplary detection mechanisms based on body postures of an intruder, in accordance with an embodiment of the present disclosure.

Additionally, other salient features of the model are:
  The model supports real time day and night intruder detection up to 70 m but not limited to the like.
  Support for multiple intruder profiles FIG. 6 illustrates exemplary detection mechanisms based on body postures of an intruder, in accordance with an embodiment of the present disclosure. In an exemplary implementation, as illustrated, a person performing different profiles such as walking, running, crouching and moving in different directions at different locations during day and night. For example, over 25 such videos were collected and a highly accurate model was obtained to get the detections. The online multiframe logic was used to improve the accuracy across video frames to get detections for each frame. The data was cleaned and removed the false detections to get around 60,000 images. Duplicate and nearly duplicate frames were removed and made a dataset of at least 15000 images were captured. As there are no publicly available datasets for more difficult profiles like Crawling and sitting, a data generation pipeline to create a synthetic data can be used. A cut-Paste augmentation can be associated with the data generation pipeline. A set of pre-selected images with no objects may be collected and used as background on which the objects to be detected may be placed. The images may be then segmented and placed on different backgrounds. In an embodiment, this generated data was then used to train models for taking detection rate for profiles like crawling from 30% to 98%.

Figure 7A:
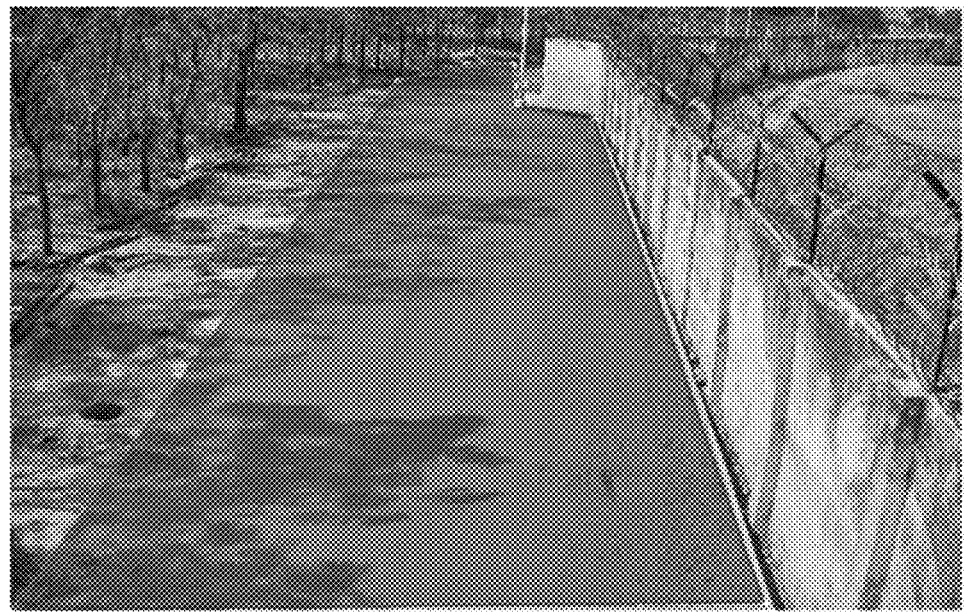
FIGS. 7A-7N illustrate exemplary representations of implementations of the IDS, in accordance with an embodiment of the present disclosure.

FIGS. 7A-7N illustrate exemplary representations of implementations of the IDS, in accordance with an embodiment of the present disclosure.

FIG. 7A illustrates an exemplary region of interest selected by a user. In an embodiment, the user can select the region of interest on the camera field of view, an alarm will be triggered when the intruder enters the region of interest and tracks the intruder's movement until the intruder leaves the region of interest. The polygon can be of any shape. There is no limit to the number of coordinates, so users can select complex shapes and sizes while selecting the region of interest.

In an exemplary embodiment, the user can select the region of interest while adding the streams to the database and for each stream the coordinates of the ROI region may be stored and will be used to raise alarms for intrusions and track the intruder. These coordinates will be stored in a database for each stream and they can be modified later too. For example, the coordinates may be stored as a list of x,y tuples but not limited to the like. So, if there are n coordinates, there will be a list of length n and each tuple represents a coordinate of the polygon selected on the frame. While performing detections across frames, the person's movement is tracking while the intruder is entering or exiting the region of interest. Alarms will be raised in real time when the person enters the region of interest and once the person moves out, the alarm will be raised again if the person enters the region.

Figure 7B:
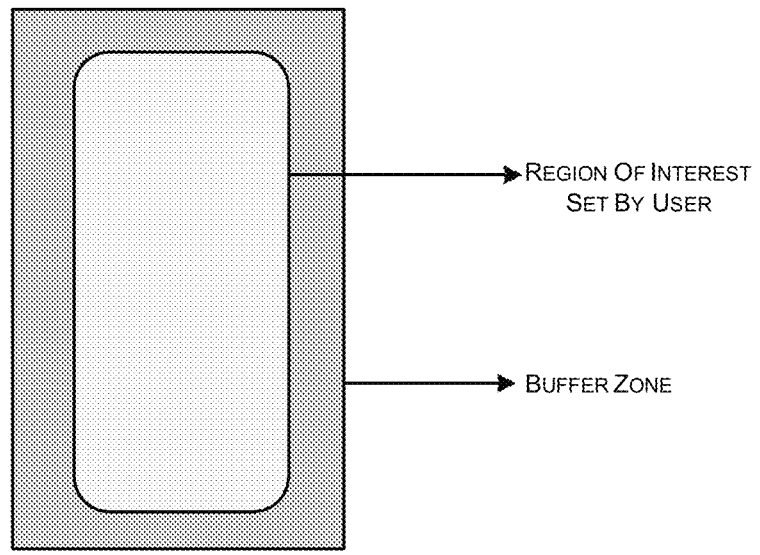

FIG. 7B illustrates an example of creation of buffer zone around the region of interest set by the user. In an exemplary embodiment, the buffer zone may be necessary to make sure that we give instant results as soon as any part of the body of the intruder enters the region of interest. It should not be the case that only when the entire body of the intruder enters the region of interest, the alarm should be raised. Instead, even if a small portion of the body such as a hand or a foot is inside the region of interest an alarm should be raised in order to alert the security personnel. For the same purpose, we have created an additional module called the touch-in-touch-out module by using additional padding/buffer zone. This will help in raising the alarm in an instant without waiting for the entire body of the person to enter the ROI. This also helps in keeping the alarms real time avoiding latency as much as possible.

Figure 7C:
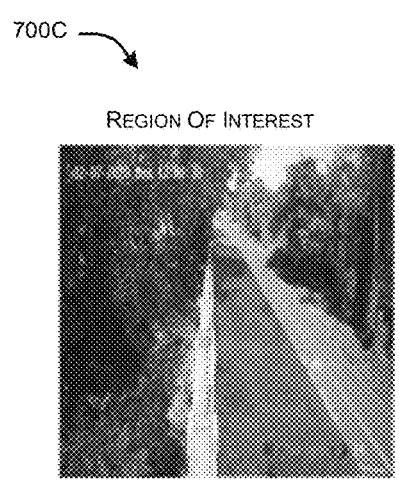

FIG. 7C illustrates an example implementation of the buffer zone set by the user highlighting actual Region of Interest and the buffer zone. The buffer zone or padding can be created on the boundary of the region of interest created by the user. Using the GUI, the user can select the buffer zone after choosing the region of interest. This buffer zone feature needs to be greater than or equal to the size specified region of interest. Coordinates of the buffer zone will be stored as a list of x,y tuples. So, if there are n coordinates, there will be a list of length n and each tuple represents a coordinate of the polygon selected on the frame. These coordinates will be stored in a database for each stream and they can be modified later too. Talking about the functioning of the buffer zone, as soon as the intruder enters the buffer zone, the detections of the intruder being sent to the alarm raising model, will start aggregating as a new tubelet instance under the online multiframe logic submodule (OML). This will help in a sort of early tracking and detection of the intruder. As soon as the bounding box of the intruder creates an intersection with the region of interest with a value above a threshold and if the conditions for raising an alarm (as per the conditions set for the multiframe logic) are met, a request for raising an alarm will be sent.

Figure 7D:
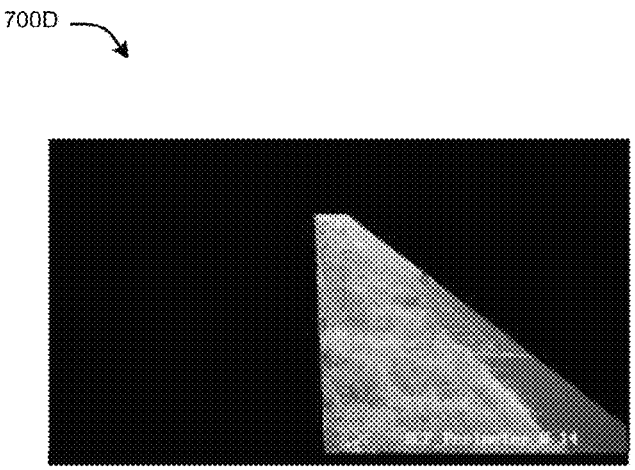

FIG. 7D illustrates a blacked-out region in the image, leaving only the ROI and buffer zone unmasked for intruder detection. In an aspect, before the images are batched and passed to the inference logic they have to be pre-processed in a format that the model can use. In an exemplary embodiment, the pre-processing may involve the steps of:
 i. blacking out images outside of the buffer zone,
 ii. resizing the image to fit in out inference module,
 iii. reshaping the image from H×W×C format to C×H×W format and
 iv. normalizing the image pixel values to the range 0 to 1.

All the steps are done serially for each of the two images in the batch and once the images are pre-processed, they may be stacked along the batch axis for inference.

In an exemplary implementation, apart from all the pixels except for the region of interest and buffer zone in the frame are blacked out by the system before processing the frame. This feature helps the system reduce false positives detection rate. Using the coordinates of ROI and the virtual buffer zone that are stored in the database, a mask will be applied over the frame to blackout all the pixels that are not in the ROI and the virtual buffer zone. Each stream has different ROI coordinates and virtual buffer zone. So blacked out frames have different shapes and sizes for different streams.

Figure 7E:
Figure 7F:
Figure 7G:
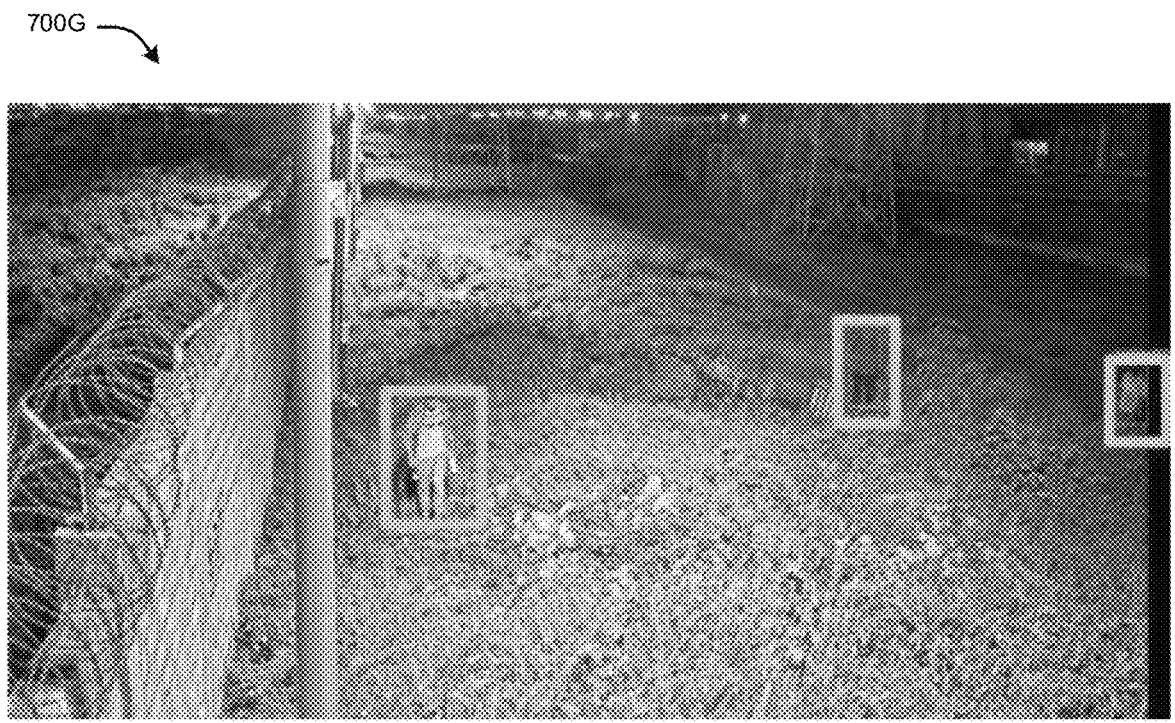
Figure 7H:
Figure 7I:
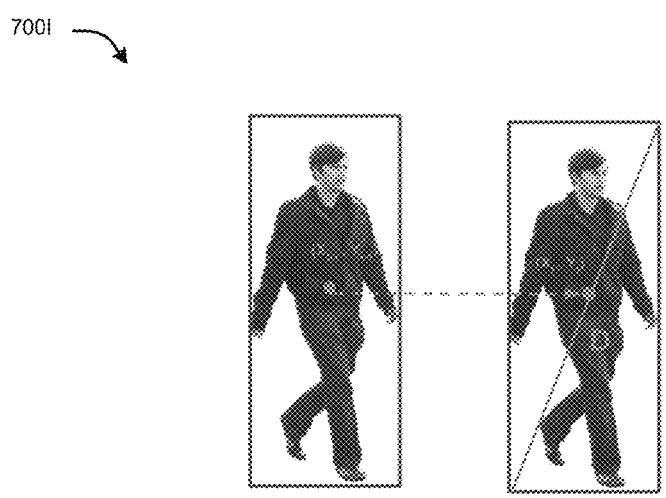
Figure 7J:
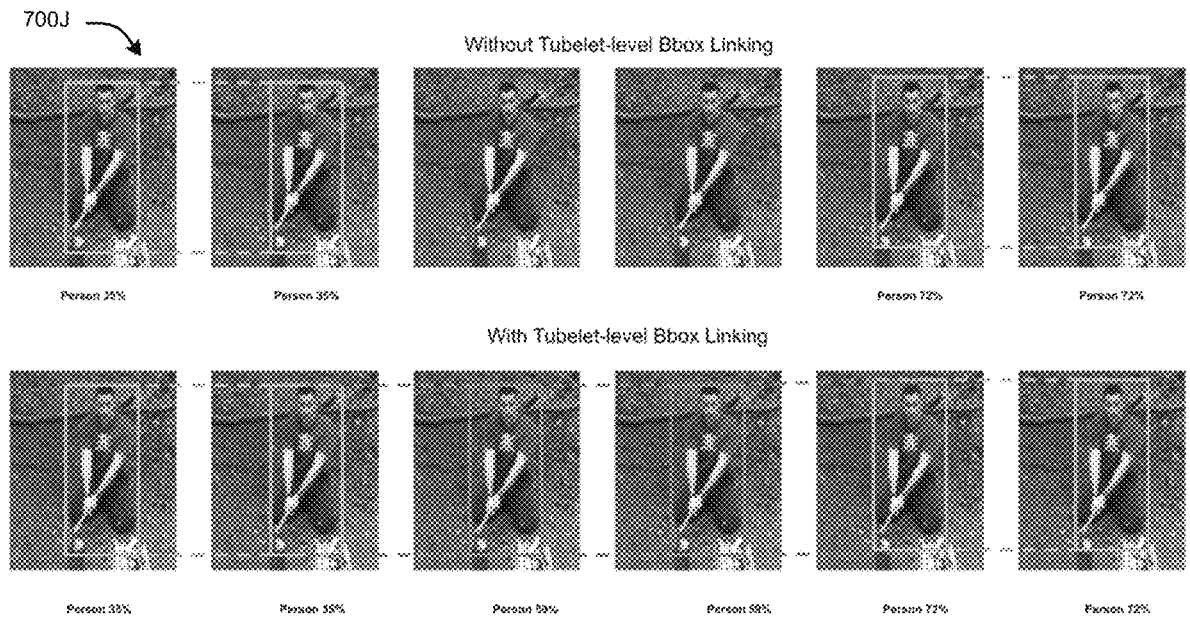

FIGS. 7E-7F illustrate exemplary representations of high-quality detections in real time during the day and at night respectively while FIGS. 7G-7H illustrate exemplary representations of high-quality detections at night time at near and far distances. On the other hand FIG. 7I illustrates an exemplary representation of Instantaneous Velocity Calculation while FIG. 7J illustrates an exemplary representation of Tubelet-level Bbox Linking: Tubelet fusion.

Figure 7K:

FIGS. 7K-7N illustrate exemplary representations of a proposed method of object addition and removal of background with reference to different types of crawling and sitting profiles. As there are no publicly available datasets for more difficult profiles like Crawling and sitting, a data generation pipeline was created to generate a new synthetic data and a cut-Paste augmentation was used as shown in FIG. 7K. As shown in FIG. 7K, a set of pre-selected images with no humans are collected and used as background on which humans to be detected are placed. FIG. 7L and FIG. 7M shows how for adding humans with different profiles, yoga images and Martial arts and Dance images are chosen. These images were then segmented and placed on different backgrounds as shown in FIG. 7N.

In an embodiment, this generated data was then used to train models for taking detection rate for profiles like crawling from 30% to 98%.

Figure 8:
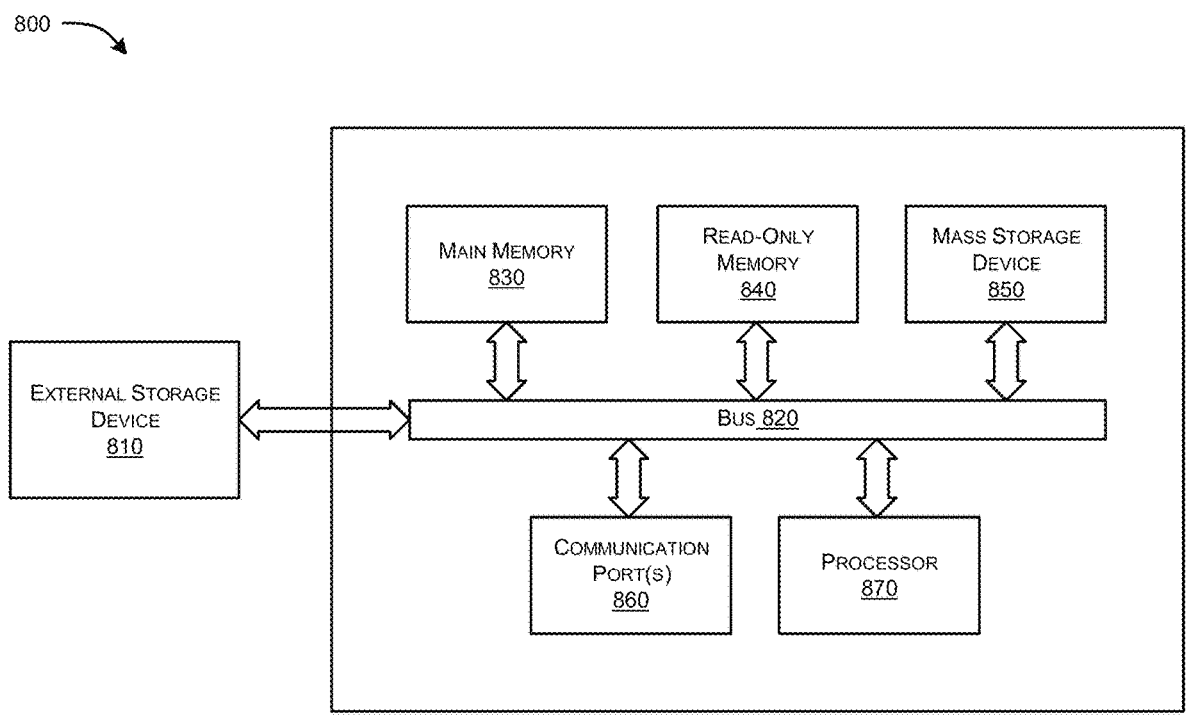
FIG. 8 illustrates an exemplary computer system in which or with which embodiments of the present invention can be utilized in accordance with embodiments of the present disclosure.

FIG. 8 illustrates an exemplary computer system in which or with which embodiments of the present invention can be utilized in accordance with embodiments of the present disclosure. As shown in FIG. 8, computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Communication port 860 may be chosen depending on a network, such a Local Area Network (LAN), Wide Area Network (WAN), or any network to which computer system connects. Memory 830 can be Random Access Memory (RAM), or any other dynamic storage device commonly known in the art. Read-only memory 840 can be any static storage device(s).

Bus 820 communicatively couples processor(s) 870 with the other memory, storage and communication blocks.

Optionally, operator and administrative interfaces, e.g. a display, keyboard, and a cursor control device, may also be coupled to bus 820 to support direct operator interaction with a computer system. Other operator and administrative interfaces can be provided through network connections. Components described above are meant only to exemplify various possibilities. In no way should the aforementioned exemplary computer system limit the scope of the present disclosure.

Thus, the present disclosure provides a unique and inventive solution for real time detection of intruders. As soon as an intruder approaches the area of interest, the real-time intruder detection system may detect the intruder and subsequently raise an alarm for intrusion. The alarm for intrusion may contain the relevant geographical coordinates. The geographical co-ordinates may be sent to the relevant drone delivery system. After the coordinates are processed by the drone, the co-ordinates may be dispatched to the concerned area where the intrusion has taken place. The camera may be attached to the drone that will observe the face of the intruder and run a facial recognition algorithm to store these details in the database. Along with this, a subsequent search mechanism will be run to check if the intruder is present in the list of any previous intruders.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Present Disclosure

The present disclosure provides for a system and a method for facilitating an online multi-frame logic submodule that enables increase in the true positives and reduce the false positives helping in receiving high accuracy for such critical high security use-cases.

The present disclosure provides for a system and a method for an online/real-time working submodule which helps in avoiding any latency for intruder detection.

The present disclosure provides for a system and a method for facilitating a buffer zone for instant detections that ensures that there is no need for a large part of the intruder's body to be a part of the Region of Interest and instead, by using the buffer zone we can raise alerts if a small part of the body enters the region of interest.

The present disclosure provides for a system and a method for facilitating a Feed type checking submodule that enables the intruder detection system to be completely agnostic to the camera feed type (RGB or IR), without any manual intervention.

The present disclosure provides for a system and a method for avoiding false alarms from Pressure sensor in outside houses and provide more accuracy with an on line camera—X Y direction.

We claim:

1. A system for facilitating detection of one or more intruders in and around an entity, said system comprising:
a plurality of camera sensors, said plurality of camera sensors operatively coupled to one or more processors, wirelessly coupled to the plurality of camera sensors through a network, said one or more processors coupled with a memory, wherein said memory stores instructions which when executed by the one or more processors cause the system to:
receive a plurality of video streams from the plurality of camera sensors;
extract, by an artificial intelligence (AI) engine, a first set of attributes from each video stream, the first set of attributes pertaining to an image associated with a combination of region of interest (ROI) and a buffer zone, wherein the AI engine is associated with the one or more processors;
based on the extracted first set of attributes, correlate, by the AI engine, the first set of attributes extracted with a knowledgebase having an image background of the ROI and the buffer zone; detect, by a detection processing module, presence of one or more intruders based on the correlation of the first set of attributes and the knowledgebase, wherein the detection processing module is associated with the one or more processors, and wherein the presence of the one or more intruders is instantly detected with respect to a part of the body of the one or more intruders being present in the buffer zone; and
calculate, by an online multi-frame logic (OML) module associated with the AI engine, an instantaneous velocity of the one or more intruders between two consecutive video frames of a plurality of video frames present in the plurality of video streams.

2. The system as claimed in claim 1, wherein an input module associated with the AI engine receives, from a user, a first set of parameters associated with the plurality of camera sensors, wherein the first set of parameters pertain to directional parameters of the plurality of camera sensors to direct the plurality of camera sensors towards the ROI and the buffer zone.

3. The system as claimed in claim 1, wherein on detection of the one or more intruders, the system alerts the entity about a possible intrusion at the ROI and the buffer zone.

4. The system as claimed in claim 1, wherein the one or more intruders includes any moving object, a person, an animal, an immobile object, and any suspicious object.

5. The system as claimed in claim 1, wherein the AI engine processes the plurality of video frames present in the plurality of video streams received from the plurality of camera sensors at real time.

6. The system as claimed in claim 1, wherein the system is further configured to:
generate, by the detection processing module, a bounding box for each intruder detected; and
send, by the detection processing module, the bounding box for each intruder to the online multi-frame logic module.

7. The system as claimed in claim 6, wherein the system is further configured to link, by the online multi-frame logic (OML) module, one or more detections associated with the bounding box for each intruder across the plurality of video frames received from the plurality of camera sensors.

8. The system as claimed in claim 7, wherein the system is further configured to:
determine, by the OML module, missed one or more detections across the plurality of video frames; and
based on the determination of the missed one or more detections, improve, by the OML module, true positives associated with the one or more detections and reduce the number of false positives associated with the missed one or more detections.

9. The system as claimed in claim 7, wherein the system is further configured to:
measure, by the OML module, velocity of each intruder enabling more control and have additional criteria for raising alarms.

10. The system as claimed in claim 1, wherein the system is further configured to be agnostic to the type of the plurality of video streams from the plurality of camera sensors being input to the system, and wherein a feed checking and model switching module associated with each camera sensor is used to process the plurality of video frames based on the type of the camera sensor feed.

11. The system as claimed in claim 1, wherein the system is further configured to:
   log a plurality of stats including alarm stats, camera stats, and individual tubelets associated with the detection of the one or more intruders.

12. A user equipment (UE) for facilitating detection of one or more intruders in and around an entity, said UE comprising:
   a plurality of camera sensors, said plurality of camera sensors operatively coupled to one or more processors, wirelessly coupled to the plurality of camera sensors through a network, said one or more processors coupled with a memory, wherein said memory stores instructions which when executed by the one or more processors cause the UE to:
      receive a plurality of video streams from the plurality of camera sensors;
      extract, by an artificial intelligence (AI) engine, a first set of attributes from each video stream, the first set of attributes pertaining to an image associated with a combination of region of interest (ROI) and a buffer zone, wherein the AI engine is associated with the one or more processors;
      based on the extracted first set of attributes, correlate, by the AI engine, the first set of attributes extracted with a knowledgebase having an image background of the ROI and the buffer zone;
      detect, by a detection processing module, presence of one or more intruders based on the correlation of the first set of attributes and the knowledgebase, wherein the detection processing module is associated with the one or more processors, and wherein the presence of the one or more intruders is instantly detected with respect to a part of the body of the one or more intruders being present in the buffer zone; and
      calculate, by an online multi-frame logic (OML) module associated with the AI engine, an instantaneous velocity of the one or more intruders between two consecutive video frames of a plurality of video frames present in the plurality of video streams.

13. A method for facilitating detection of one or more intruders in and around an entity, said method comprising:
   receiving, by one or more processors, a plurality of video streams from a plurality of camera sensors, wherein the plurality of camera sensors are operatively coupled to the one or more processors, wirelessly coupled to the plurality of camera sensors through a network, the one or more processors coupled with a memory, wherein said memory stores instructions executed by the one or more processors;
   extracting, by an artificial intelligence (AI) engine, a first set of attributes from each video stream, the first set of attributes pertaining to an image associated with a combination of region of interest (ROI) and a buffer zone, wherein the AI engine is associated with the one or more processors;
   based on the extracted first set of attributes, correlating, by the AI engine, the first set of attributes extracted with a knowledgebase having an image background of the ROI and the buffer zone;
   detecting, by a detection processing module, presence of the one or more intruders based on the correlation of the first set of attributes and the knowledgebase, wherein the detection processing module is associated with the one or more processors, and wherein the presence of the one or more intruders is instantly detected with respect to a part of the body of the one or more intruders being present in the buffer zone; and
   calculating, by an online multi-frame logic (OML) module associated with the AI engine, an instantaneous velocity of the one or more intruders between two consecutive video frames of a plurality of video frames present in the plurality of video streams.

14. The method as claimed in claim 13, wherein the method further comprises the step of:
   receiving, by an input module associated with the AI engine a first set of parameters from a user, said first set of parameters associated with the plurality of camera sensors, wherein the first set of parameters pertain to directional parameters of the plurality of camera sensors to direct the plurality of camera sensors towards the ROI and the buffer zone.

15. The method as claimed in claim 13, wherein on detection of the one or more intruders, the method further comprises the step of:
   alerting the entity about a possible intrusion at the ROI and the buffer zone.

16. The method as claimed in claim 13, wherein the method further comprises the steps of:
   generating, by the detection processing module, a bounding box for each intruder detected; and
   sending, by the detection processing module, the bounding box for each intruder to the online multi-frame logic (OML) module.

17. The method as claimed in claim 16, wherein the method further comprises the steps of:
   linking, by the OML module, one or more detections associated with the bounding box for each intruder across the plurality of video frames received from the plurality of camera sensors;
   determining, by the OML module, missed one or more detections across the plurality of video frames;
   based on the determination of the missed one or more detections, improving, by the OML module, true positives associated with the one or more detections and reduce the number of false positives associated with the missed one or more detections; and
   measuring, by the OML module, velocity of each intruder enabling more control and have additional criteria for raising alarms.

18. The method as claimed in claim 13, wherein the method further comprises the step of:
   logging, by the one or more processors, a plurality of stats including alarm stats, camera stats, and individual tubelets associated with the detection of the one or more intruders.

* * * * *